(12) United States Patent
Hanson (10) Patent No.: US 9,789,570 B2
(45) Date of Patent: Oct. 17, 2017

(54) ISO-GRID COMPOSITE COMPONENT

(71) Applicant: United Technologies Corporation, Hartford, CT (US)

(72) Inventor: Russell B. Hanson, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 170 days.

(21) Appl. No.: 14/753,071

(22) Filed: Jun. 29, 2015

(65) Prior Publication Data

US 2015/0375348 A1    Dec. 31, 2015

Related U.S. Application Data

(62) Division of application No. 12/892,014, filed on Sep. 28, 2010, now Pat. No. 9,126,374.

(51) Int. Cl.
| | | |
|---|---|---|
| *B23P 15/04* | (2006.01) | |
| *B29C 70/08* | (2006.01) | |
| *B29C 70/30* | (2006.01) | |
| *B29D 28/00* | (2006.01) | |

(52) U.S. Cl.
CPC ............ *B23P 15/04* (2013.01); *B29C 70/085* (2013.01); *B29C 70/30* (2013.01); *B29D 28/005* (2013.01); *Y10T 156/10* (2015.01); *Y10T 428/24612* (2015.01)

(58) Field of Classification Search
CPC ....... B23P 15/04; B29C 70/30; B29C 70/085; B29D 28/005; Y10T 428/24612; Y10T 156/10

See application file for complete search history.

(56) References Cited

U.S. PATENT DOCUMENTS

| | | |
|---|---|---|
| 2,688,327 A | 9/1954 | Berg |
| 2,898,940 A | 8/1959 | Cole, Jr. |
| 2,999,780 A | 9/1961 | Perrault |
| 3,013,315 A | 12/1961 | Smith, Jr. |
| 3,018,205 A | 1/1962 | Barut |
| 3,075,249 A | 1/1963 | Sucher |
| 3,088,174 A | 5/1963 | Kolt |
| 3,093,160 A | 6/1963 | Boggs |
| 3,134,705 A | 5/1964 | Moeller |
| 3,210,233 A | 10/1965 | Kummer et al. |
| 3,257,253 A | 6/1966 | Hoyt |
| 3,272,686 A | 9/1966 | Smith et al. |
| 3,341,395 A | 9/1967 | Weber |
| 3,349,157 A | 10/1967 | Parsons |

(Continued)

FOREIGN PATENT DOCUMENTS

EP    0953433    11/1999

*Primary Examiner* — John C Hong
(74) *Attorney, Agent, or Firm* — Carlson, Gaskey & Olds, P.C.

(57) ABSTRACT

A method of defining a rib structure within an iso-grid composite component according to an exemplary aspect of the present disclosure includes, among other things, defining a first rib at least partially with a uni-tape ply bundle at a first level, the uni-tape ply bundle including uni-tape plies and a first spacer ply, and defining a second rib transverse to the first rib at least partially with a spacer at the first level, the spacer including a second, different spacer ply, the spacer transverse to the uni-tape ply bundle such that the spacer is interrupted by the uni-tape ply bundle.

20 Claims, 6 Drawing Sheets

(56) References Cited

U.S. PATENT DOCUMENTS

| | | |
|---|---|---|
| 3,551,237 A | 12/1970 | Cox et al. |
| 3,574,040 A | 4/1971 | Chitwood et al. |
| 3,617,416 A | 11/1971 | Kromrey et al. |
| 3,645,833 A | 2/1972 | Figge |
| 3,693,354 A | 9/1972 | Hull, Jr. |
| 3,757,827 A | 9/1973 | Seiwert et al. |
| 3,772,126 A | 11/1973 | Myers |
| 3,779,851 A | 12/1973 | Hertz |
| 3,790,432 A | 2/1974 | Fletcher et al. |
| 3,793,827 A | 2/1974 | Ekstedt |
| 3,817,806 A | 6/1974 | Anderson et al. |
| 3,940,891 A | 3/1976 | Slysh |
| 3,958,055 A | 5/1976 | Hadley et al. |
| 3,962,393 A | 6/1976 | Blad |
| 3,996,084 A | 12/1976 | Holmes |
| 3,999,998 A | 12/1976 | Carbonnel et al. |
| 4,012,549 A | 3/1977 | Slysh |
| 4,015,653 A | 4/1977 | Slysh et al. |
| 4,040,333 A | 8/1977 | Slysh |
| 4,051,289 A | 9/1977 | Adamson |
| 4,056,309 A | 11/1977 | Harbison et al. |
| 4,063,847 A | 12/1977 | Simmons |
| 4,086,378 A | 4/1978 | Kam et al. |
| 4,116,258 A | 9/1978 | Slysh et al. |
| 4,137,354 A | 1/1979 | Mayes, Jr. et al. |
| 4,151,872 A | 5/1979 | Slysh et al. |
| 4,165,355 A | 8/1979 | Vasilos |
| 4,177,306 A | 12/1979 | Schulz et al. |
| RE30,489 E | 1/1981 | Abbott |
| 4,248,649 A | 2/1981 | Harrison et al. |
| 4,284,679 A | 8/1981 | Blad et al. |
| 4,285,194 A | 8/1981 | Nash |
| 4,292,108 A | 9/1981 | Weiss et al. |
| 4,308,699 A | 1/1982 | Slysgh |
| 4,395,450 A | 7/1983 | Whitener |
| 4,443,059 A | 4/1984 | Wells |
| 4,464,429 A | 8/1984 | Michaud-Soret |
| 4,470,860 A | 9/1984 | Gill et al. |
| 4,508,584 A | 4/1985 | Charles |
| 4,575,029 A | 3/1986 | Harwood et al. |
| 4,584,226 A | 4/1986 | Vitale et al. |
| 4,598,007 A | 7/1986 | Kourtides et al. |
| 4,622,254 A | 11/1986 | Nishimura et al. |
| 4,633,632 A | 1/1987 | Sarh |
| 4,635,071 A | 1/1987 | Gounder et al. |
| 4,636,422 A | 1/1987 | Harris et al. |
| 4,683,018 A | 7/1987 | Sutcliffe et al. |
| 4,711,398 A | 12/1987 | Ganderton et al. |
| 4,715,560 A | 12/1987 | Loyek |
| 4,735,672 A | 4/1988 | Blad |
| 4,786,541 A | 11/1988 | Nishimura et al. |
| 4,803,108 A | 2/1989 | Leuchten et al. |
| 4,822,660 A | 4/1989 | Lipp |
| 4,872,619 A | 10/1989 | Vaniglia |
| 4,877,193 A | 10/1989 | Vaniglia |
| 4,880,681 A | 11/1989 | Price et al. |
| 4,888,247 A | 12/1989 | Zweben et al. |
| 4,907,754 A | 3/1990 | Vaniglia |
| 4,938,824 A | 7/1990 | Youngkeit |
| 4,943,014 A | 7/1990 | Harwood et al. |
| 4,943,338 A | 7/1990 | Wisbey |
| 4,961,685 A | 10/1990 | Neubert |
| 4,968,546 A | 11/1990 | Takahashi |
| 4,969,623 A | 11/1990 | Bernier |
| 4,990,390 A | 2/1991 | Kawasaki |
| 5,015,326 A | 5/1991 | Frank |
| 5,038,834 A | 8/1991 | Siegfried |
| 5,045,147 A | 9/1991 | Benson et al. |
| 5,061,418 A | 10/1991 | Ware |
| 5,089,328 A | 2/1992 | Doerer et al. |
| 5,110,395 A | 5/1992 | Vaniglia |
| 5,115,655 A | 5/1992 | Martin et al. |
| 5,122,242 A | 6/1992 | Slysh |
| 5,135,799 A | 8/1992 | Gross et al. |
| 5,145,543 A | 9/1992 | Redd et al. |
| 5,170,967 A | 12/1992 | Hamamoto et al. |
| 5,173,315 A | 12/1992 | Charlson et al. |
| 5,182,906 A | 2/1993 | Gilchrist et al. |
| 5,186,999 A | 2/1993 | Brambach |
| 5,200,251 A | 4/1993 | Brand |
| 5,211,007 A | 5/1993 | Marvin |
| 5,222,360 A | 6/1993 | Antuna et al. |
| 5,223,067 A | 6/1993 | Hamamoto et al. |
| 5,229,184 A | 7/1993 | Campbell et al. |
| 5,233,737 A | 8/1993 | Policelli |
| 5,234,757 A | 8/1993 | Wong |
| 5,242,523 A | 9/1993 | Willden et al. |
| 5,251,435 A | 10/1993 | Pauley |
| 5,279,092 A | 1/1994 | Williamsen et al. |
| 5,284,702 A | 2/1994 | Umemoto et al. |
| 5,290,389 A | 3/1994 | Shupe et al. |
| 5,305,599 A | 4/1994 | Marvin |
| 5,313,788 A | 5/1994 | Wright et al. |
| 5,315,820 A | 5/1994 | Arnold |
| 5,332,178 A | 7/1994 | Williams |
| 5,333,003 A | 7/1994 | Archer |
| 5,338,594 A | 8/1994 | Wang et al. |
| 5,362,347 A | 11/1994 | Domine |
| 5,409,349 A | 4/1995 | Kulak et al. |
| 5,409,775 A | 4/1995 | Harada et al. |
| 5,413,456 A | 5/1995 | Kulak et al. |
| 5,431,532 A | 7/1995 | Humke |
| 5,443,884 A | 8/1995 | Lusignea et al. |
| 5,445,861 A | 8/1995 | Newton et al. |
| 5,462,791 A | 10/1995 | Kashima et al. |
| 5,469,686 A | 11/1995 | Pykiet |
| 5,472,553 A | 12/1995 | Roberts |
| 5,482,429 A | 1/1996 | Penda |
| 5,485,723 A | 1/1996 | McCoy et al. |
| 5,516,257 A | 5/1996 | Kasprow et al. |
| 5,536,541 A | 7/1996 | Armellini |
| 5,554,430 A | 9/1996 | Pollatta et al. |
| 5,556,677 A | 9/1996 | Quigley et al. |
| 5,596,870 A | 1/1997 | Dillard et al. |
| 5,620,652 A | 4/1997 | Tack et al. |
| 5,622,733 A | 4/1997 | Asher |
| 5,698,066 A | 12/1997 | Johnson et al. |
| 5,771,680 A | 6/1998 | Zahedi et al. |
| 5,814,386 A | 9/1998 | Vasiliev et al. |
| 5,871,117 A | 2/1999 | Protasov et al. |
| 6,007,894 A | 12/1999 | Barnes et al. |
| 6,013,341 A | 1/2000 | Medvedev et al. |
| 6,073,670 A | 6/2000 | Koury |
| 6,288,170 B1 | 9/2001 | Waid |
| 6,290,799 B1 | 9/2001 | Deckers et al. |
| 6,743,504 B1 | 6/2004 | Allen et al. |
| 7,624,567 B2 | 12/2009 | Peters |
| 7,624,579 B2 | 12/2009 | Peters |
| 7,757,477 B2 | 7/2010 | Kehret et al. |
| 7,818,487 B2 * | 10/2010 | Chu .................. G06F 1/12 709/227 |
| 8,444,900 B2 * | 5/2013 | Wilson .............. B29C 33/42 156/173 |
| 2006/0116040 A1 | 6/2006 | Yun |
| 2009/0011175 A1 | 1/2009 | Sekine et al. |

* cited by examiner

ISO-GRID COMPOSITE COMPONENT

CROSS REFERENCE TO RELATED APPLICATIONS

This application is a divisional of U.S. patent application Ser. No. 12/892,014, filed Sep. 28, 2010.

STATEMENT REGARDING FEDERALLY SPONSORED RESEARCH OR DEVELOPMENT

This disclosure was made with Government support under N00019-02-C-3003 awarded by The United States Air Force. The Government has certain rights in this invention.

BACKGROUND

The present disclosure relates to an iso-grid composite component and more particularly to gas turbine engines having convergent/divergent nozzles with iso-grid composite components.

A variable area exhaust nozzle optimizes the thrust produced within a gas turbine engine. In augmented gas turbine engines, convergent/divergent (C/D) nozzles provide a multitude of nozzle positions. The term "convergent-divergent" describes an exhaust nozzle having a convergent section upstream of a divergent section. Exhaust gases exiting the turbine section pass through the decreasing diameter convergent section before passing through the increasing diameter divergent section.

The convergent section is pivotally connected to an exhaust duct structure and to the divergent section. The divergent section is pivotally connected to the convergent section and to an external fairing positioned radially outboard of the divergent section. The upstream end of the external fairing is pivotally attached to an outer static structure to provide an outer aerodynamic surface for the C/D. The convergent, divergent, and external fairing sections generally include flaps and seals to accommodate changes in the nozzle variable orifice area and axis skew (if the nozzle is vectorable) by sliding relative to and overlapping each other as the orifice area decreases or increases.

The flaps and seals are often manufactured of carbon fiber composites which incorporate either monocoque constructions (consistent thickness part) or hollow rib reinforcements. Although effective, these techniques may require significant weight or design space.

SUMMARY

An iso-grid composite component according to an exemplary aspect of the present disclosure includes a spacer transverse to a uni-tape ply bundle, the spacer interrupted by the uni-tape ply bundle.

An iso-grid composite component according to an exemplary aspect of the present disclosure includes a multiple of uni-tape ply bundles, each of the multiple of uni-tape ply bundles at different levels within a rib pattern such that each uni-tape ply bundle within a level of a first rib of the rib pattern is uninterrupted by a spacer which at least partially defines a second rib of the rib pattern transverse to the first rib at the respective level.

A method of defining a rib structure within an iso-grid composite component according to an exemplary aspect of the present disclosure includes defining a first rib at least partially with a uni-tape ply bundle at a first level and defining a second rib transverse to the first rib at least partially with a spacer at the first level, the spacer interrupted by the uni-tape ply bundle.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
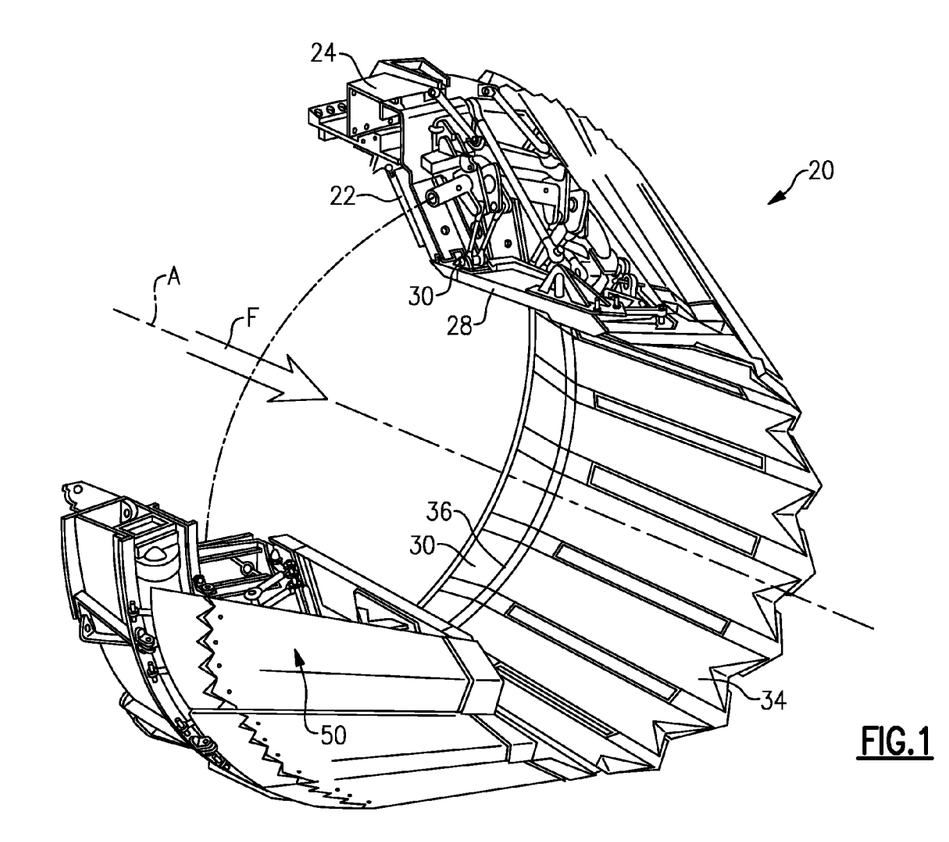
FIG. 1 is a general perspective view of a variable geometry C/D exhaust nozzle of the present invention with the nozzle shown in a minimum dilated position.

FIG. 1 schematically illustrates a convergent/divergent (C/D) nozzle system 20 for a gas turbine engine. The nozzle system 20 is movable between a minimal dilated position (FIG. 1), which is typical during non-afterburning operation and a maximum dilated position (not shown), which is typical during afterburning operation.

The nozzle system 20 generally includes a plurality of circumferentially distributed convergent flaps 22, each pivotably connected to a nozzle static structure 24. A plurality of circumferentially distributed divergent flaps 28 are pivotably connected through a joint structure 30 to adjust an aft end section of each convergent flap 22. A plurality of convergent seals 32 are each pivotally connected to a respective divergent seal 34 which are respectively distributed circumferentially between each divergent flap 28 and convergent flap 28 sets. Each convergent seal 32 is pivotably connected to the static structure 24 with each divergent seal 34 pivotably connected through a joint structure 36 adjacent an aft end section of each convergent seal 32. The convergent and divergent flaps 22, 28 and the convergent and divergent seals 32, 34, taken collectively, define the radial outer boundary of a combustion gas path F to define a convergent section 38 and a divergent section 40 with a throat area 42 defined therebetween (FIG. 2).

Figure 2:
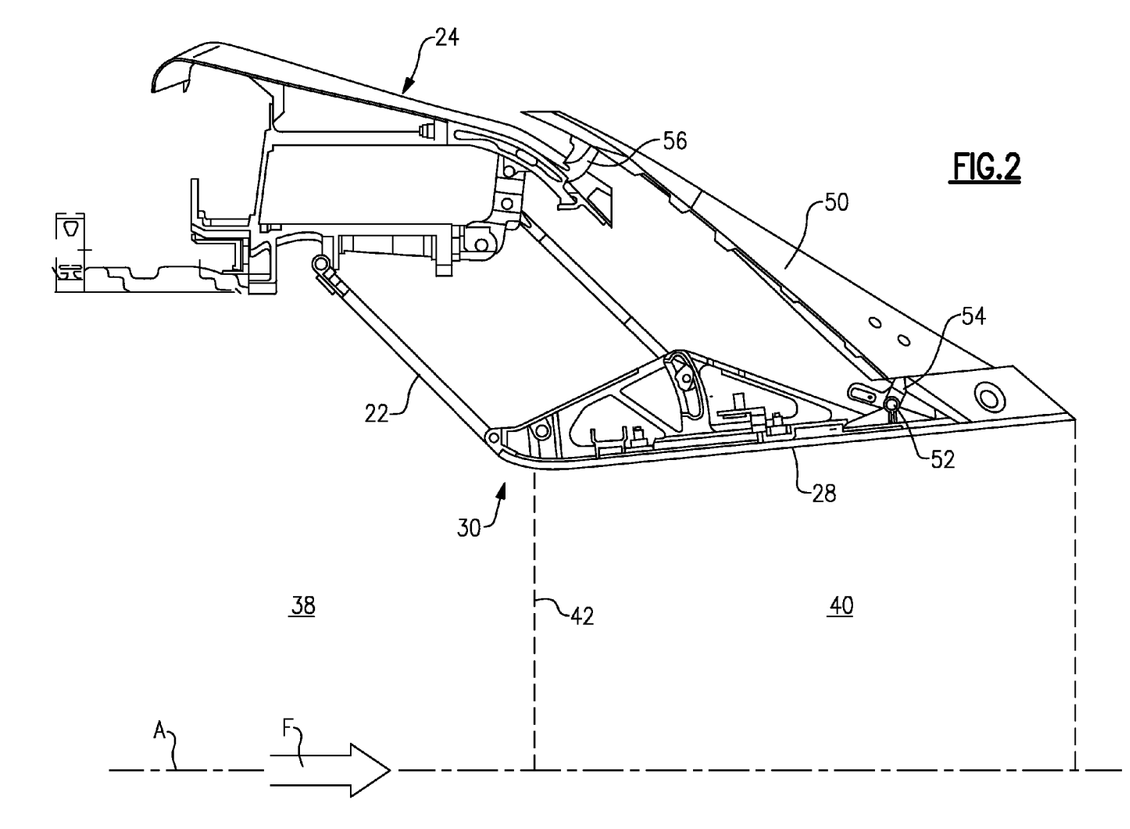
FIG. 2 is a general partial sectional side view of a variable geometry C/D exhaust nozzle of the present invention with the nozzle shown in a minimum dilated position which corresponds with FIG. 1.
Figure 3:
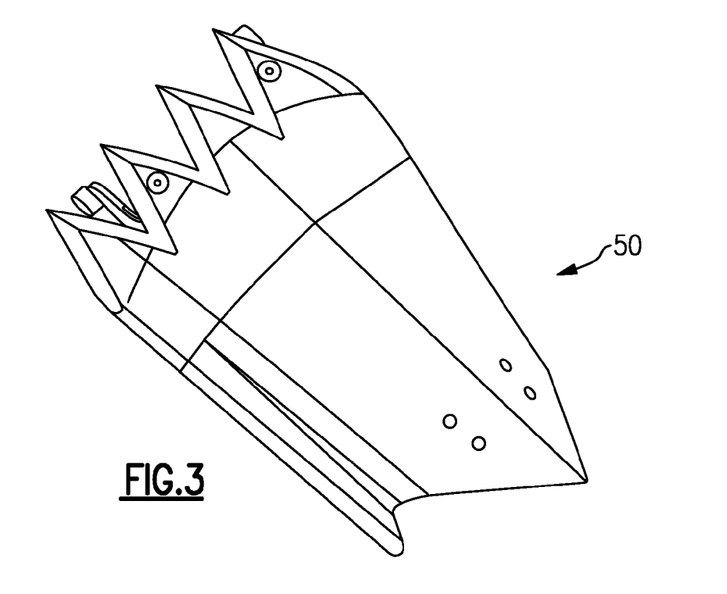
FIG. 3 is an outer perspective view of an external flap manufactured of composite materials in an iso-grid construction according to the present disclosure.
Figure 4:
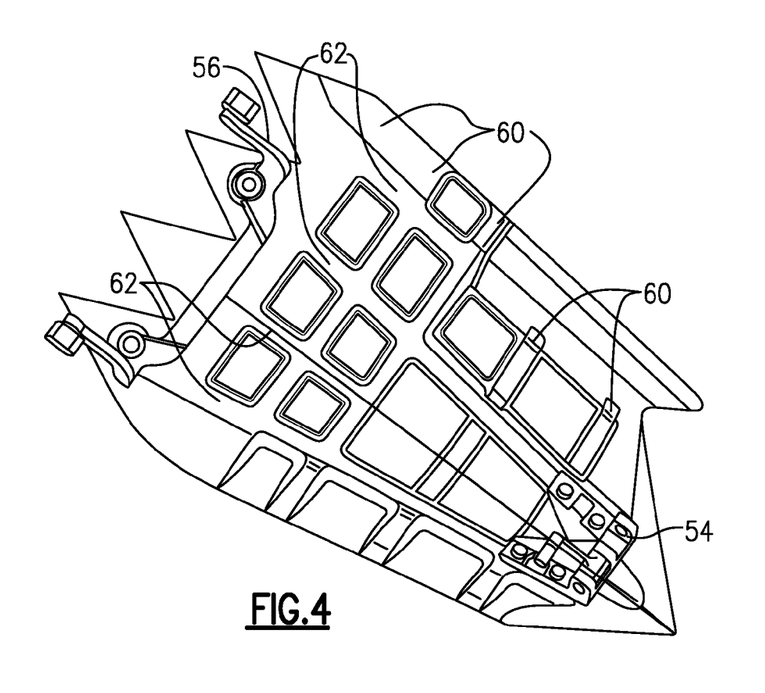
FIG. 4 is an inner perspective view of the external flap of FIG. 3 manufactured of composite materials in an iso-grid construction according to the present disclosure.

With reference to FIG. 2, an outer aerodynamic surface of the nozzle system 20 is defined by a plurality of external flaps 50 (FIGS. 3 and 4). Each of the plurality of external flaps 50 pivot relative a respective divergent flap 28 about a pivot axis 52 defined by an external flap hinge 54 (FIG. 4). Each of the plurality of external flaps 50 also slide relative the nozzle static structure 24 through track arms 56 (FIG. 4). The plurality of external flaps 50, taken collectively, define an outer aerodynamic surface of the nozzle system 20 and accommodate movement between the maximum dilated position and the minimal dilated position through sliding movement relative the static structure 24 and overlapping movement between adjacent external flaps 50.

Figure 5:
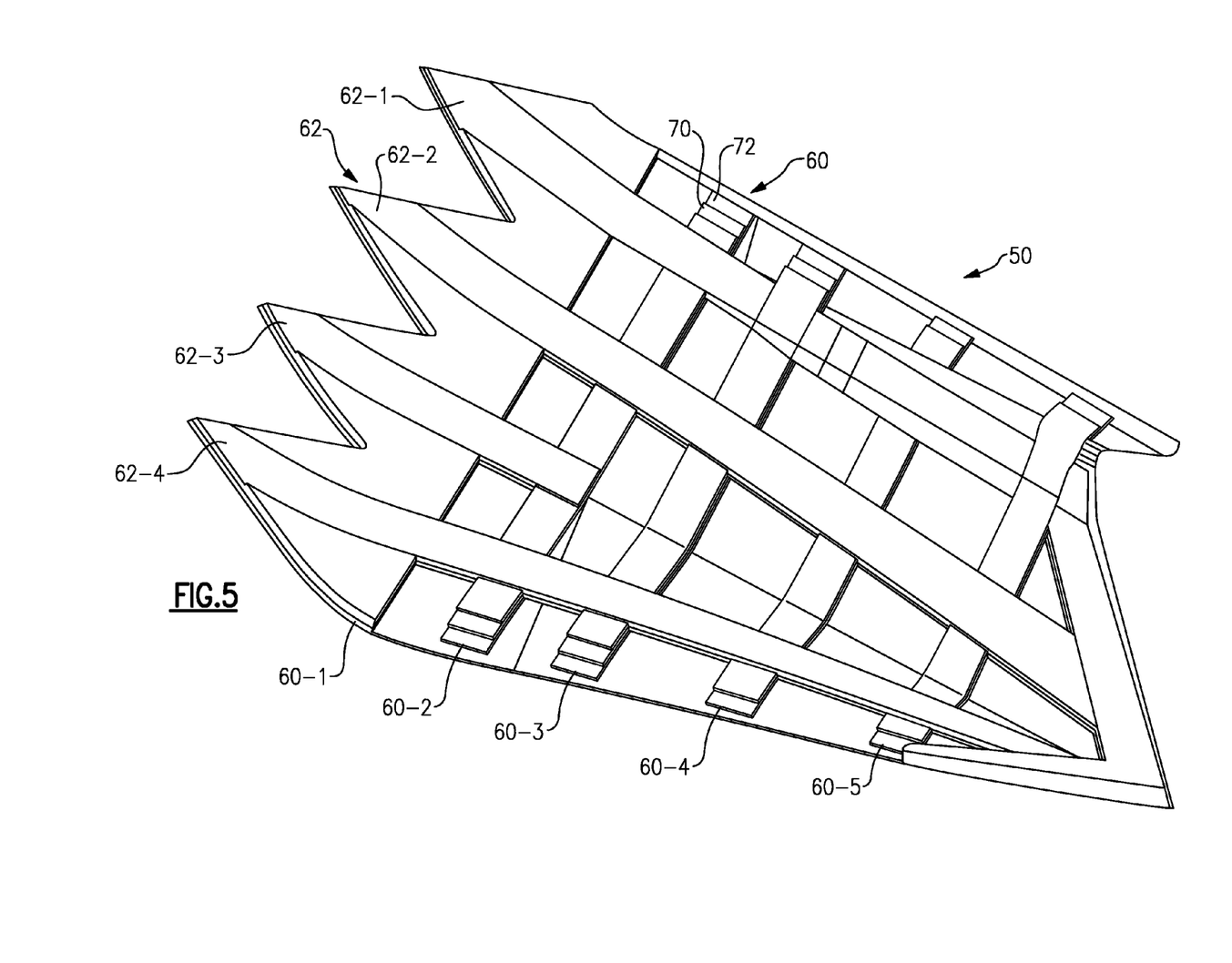
FIG. 5 is an inner perspective view of the external flap illustrating a multiple of lateral ribs and longitudinal ribs formed from a multiple of uni-tape ply bundles and spacers in which only the spacers are interrupted, the iso-grid construction shown without interstitial ply layer between each level of the multiple of uni-tape ply bundles and spacers.

With reference to FIG. 5, each external flap 50 includes an iso-grid construction (FIG. 6) that alternatively interrupts the internal load paths within a multiple of lateral ribs 60 and longitudinal ribs 62 so as to prevent an internal thermal fight which would heretofor cause internal dissolution of the component. In one non-limiting embodiment, the external flap 50 includes four longitudinal ribs 62-1-62-4 and five lateral ribs 60-1-60-5. It should be understood that the particular rib arrangement is related to the desired shape of the component such as the external flap 50. Although the iso-grid construction is illustrated herein with regards to an external flap 50 in accords with one non-limiting embodiment, it should be realized that any composite iso-grid structure will benefit herefrom. It should also be understood that although relatively rectilinear iso-grid geometry is illustrated, other geometries are usable herewith.

Figure 6:
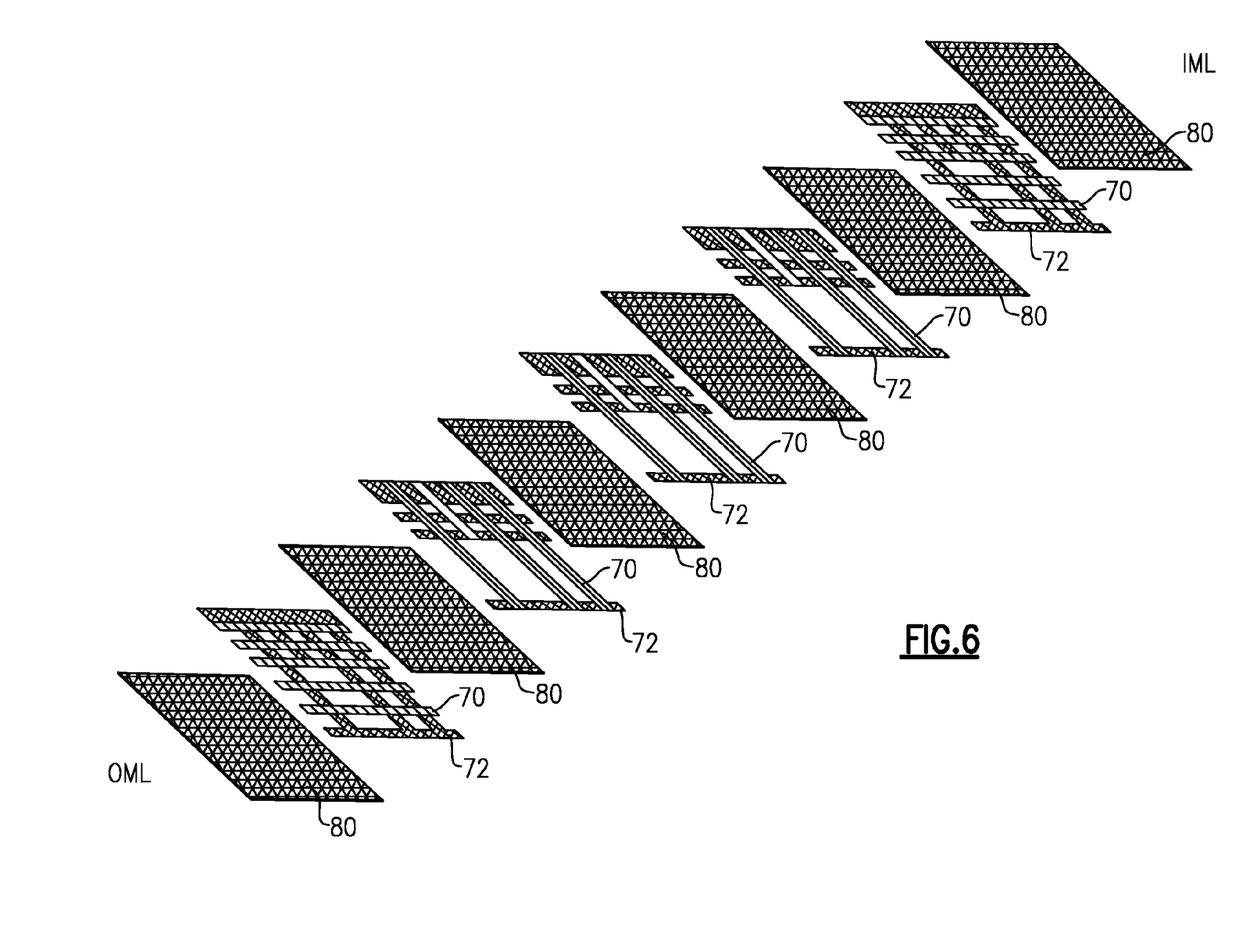
FIG. 6 is an exploded view of the layup which provides a multiple of uni-tape ply bundles and spacer levels which define the ribs and the interstitial ply layers which separate the multiple of uni-tape ply bundles and spacer levels.
Figure 7:
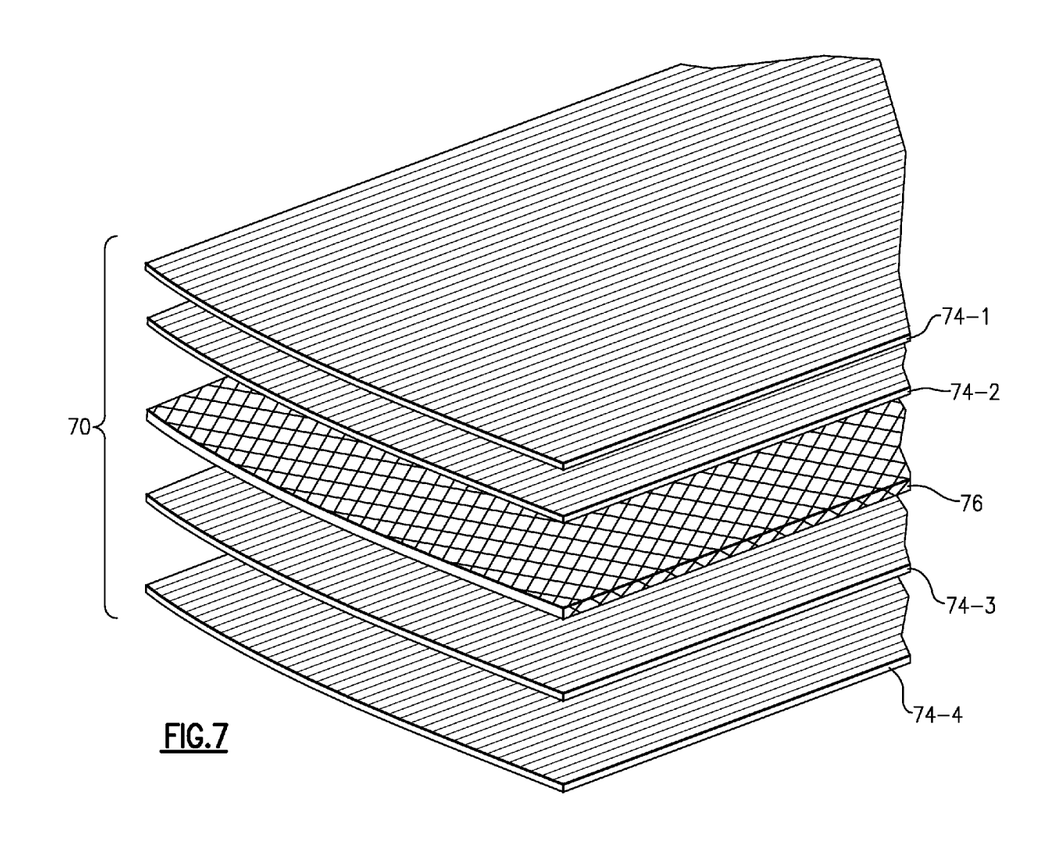
FIG. 7 is an exploded view of a single uni-tape ply bundle.

With reference to FIG. 6, the multiple of lateral ribs 60 and longitudinal ribs 62 of the iso-grid construction are formed from a multiple of uni-tape ply bundles 70 and spacers 72 in which only the spacers 72 are interrupted. In one non-limiting embodiment, each uni-tape ply bundle 70 is a buildup of four (4) uni-tape plies 74-1; 74-2; 74-3; 74-4 and one spacer ply 76 such that the spacer ply 76 separates two (2) uni-tape plies 74-1; 74-2 from two (2) uni-tape plies 74-3; 74-4 (FIG. 7). Two (2) uni-tape plies 74 are generally of an equivalent height to one spacer ply 76 such that one (1) uni-tape ply bundle 70 is of an approximate equivalent height to three (3) spacer plies 76 within each of the ribs 60, 62. Generally, no more than 4 uni-tape plies are located adjacent to each other and the middle spacer ply 76 of the uni-tape ply bundle 70 may be oriented at a 45° direction to the associated uni-tape ply 74 direction.

The iso-grid composite component construction makes use of the higher strength uni-tape plies 74 to build up strong and low weight internal ribs 60, 62. Internal thermal fights between transverse uni-tape plies 74 are avoided by selectively alternating each uni-tape ply bundle 70 at different heights within the rib pattern such that when one un-interrupted uni-tape ply bundle 70 is within one level of the longitudinal rib 62, the lateral rib 60 transverse thereto is defined by a spacer 72 which is interrupted at that level. At an adjacent level, the uni-tape ply bundle 70 runs un-interrupted within the lateral rib 60 while the longitudinal rib 62 at the same level includes the interrupted spacer 72. That is, each uni-tape ply bundle 70 runs un-interrupted regardless of the level or direction for that particular uni-tape ply bundle 70. It should be understood that any number of levels may be provided to build up the particular iso-grid component such as the disclosed external flap 50.

In addition, each level of uni-tape ply bundles 70 and spacers 72 which form the multiple of lateral ribs 60 and longitudinal ribs 62 may be separated by an interstitial ply layer 80. Each interstitial ply layer 80 may itself be a layup of any number of spacer plies such as fabric plies which are arranged at particular relative angular orientations. It should be understood that any number of such plies may be so utilized between the multiple of lateral ribs 60 and longitudinal ribs 62.

The uni-tape ply bundles 70 are uninterrupted and the spacers 72 are utilized to equalize height such that the uni-tape ply bundles 70 within the lateral ribs 60 and longitudinal ribs 62 do not directly overlap to form uni-tape ply "bumps" at intersections between the lateral ribs 60 and longitudinal ribs 62. That is, transverse uni-tape ply bundles 70 are separated and spaced by the spacers 72 so that a constant height is maintained as Applicant has determined that such "bumps" may result in delamination regions since uni-tape has an inherent difference in thermal growth along the fiber direction as compared to across the fiber direction. Typical differences in this thermal growth approach 20 times such that the thermal expansion at a "bump" in conventional rib layups in which uni-tape directly overlaps and forms a "bump" may often result in delaminating and potential internally generated destruction of the layup. Moreover, Applicant has determined that the spacers 72 cushion and accommodate the thermal expansion which results in a robust but relatively light weight component.

The iso-grid construction is lighter than monocoque constructions as uni-tape fibers can be placed to selectively follow the load paths. The iso-grid construction is also considerably more compact in the thickness direction than top hat hollow rib construction which facilitates usage in confined regions such as C/D nozzles as well as various other components.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of constructing a rib structure within an iso-grid composite component comprising:
    forming a first rib at least partially with a uni-tape ply bundle at a first level, said uni-tape ply bundle including uni-tape plies and a first spacer ply, each of said uni-tape plies including a first material, and said first spacer ply including a second material that is different from the first material in fiber construction; and
    forming a second rib transverse to said first rib at least partially with a spacer at said first level, said spacer including a second, different spacer ply, said second spacer ply also including said second material, said spacer transverse to said uni-tape ply bundle such that said spacer is interrupted by said uni-tape ply bundle.

2. A method as recited in claim 1, comprising:
    maintaining an approximately equal height of said uni-tape ply bundle and said spacer within said first level.

3. The method as recited in claim 1, wherein said uni-tape ply bundle is a buildup of four (4) of said uni-tape plies and one (1) of said first spacer ply such that said first spacer ply separates two (2) of said uni-tape plies from two (2) other of said uni-tape plies.

4. The method as recited in claim 3, wherein said spacer is a buildup of three (3) of said second spacer plies.

5. The method as recited in claim 4, wherein said uni-tape ply bundle and said spacer are of approximately equal height.

6. The method as recited in claim 1, wherein said uni-tape ply bundle is a buildup of said uni-tape plies and said first spacer ply such that said first spacer ply separates said uni-tape plies.

7. The method as recited in claim 1, comprising:
forming an interstitial ply layer adjacent said uni-tape ply bundle and said spacer, said interstitial ply layer including a third material different in fiber construction from said first material.

8. The method as recited in claim 7, comprising:
forming a second spacer and a second uni-tape ply bundle adjacent said interstitial ply layer, said second spacer at least partially defining said first rib, and said second uni-tape ply bundle at least partially defining said second rib.

9. The method as recited in claim 8, wherein said second uni-tape ply bundle and said second spacer are of approximately equal height.

10. The method as recited in claim 1, wherein said fiber construction of said first material is uni-directional, and said fiber construction of said second material is fabric.

11. A method of constructing an iso-grid composite component comprising:
forming a multiple of uni-tape ply bundles, each of said uni-tape ply bundles including uni-tape plies and a first spacer ply, each of said uni-tape plies including a first material and said first spacer ply including a second material that is different from the first material in fiber construction; and
forming a multiple of spacers, each of said multiple of spacers including a second, different spacer ply also including said second material, each of said multiple of uni-tape ply bundles at different levels within a rib pattern such that each uni-tape ply bundle within a level of a first rib of said rib pattern is uninterrupted by at least one of said multiple of spacers which at least partially defines a second rib of said rib pattern transverse to said first rib of said rib pattern at said respective level.

12. The method as recited in claim 11, wherein each of said multiple of uni-tape ply bundles and each of said multiple of spacers is of approximately equal height within said respective level.

13. The method as recited in claim 11, comprising:
forming an interstitial ply layer adjacent each level of said multiple of uni-tape ply bundles and said multiple of spacers within said respective level, said interstitial ply layer including a third material different in fiber construction from said first material.

14. The method as recited in claim 13, wherein said first rib and said second rib define a space at each of said respective levels, said space extending at least partially between said respective levels, said space being free of said multiple of uni-tape ply bundles and said multiple of spacers, said interstitial ply at least partially disposed within said space.

15. The method as recited in claim 11, wherein the step of forming said multiple of uni-tape ply bundles includes alternating said multiple of uni-tape ply bundles at different levels within said rib pattern such that each uni-tape ply bundle within a level of said second rib of said rib pattern is uninterrupted by at least one of said multiple of spacers which at least partially defines said first rib of said rib pattern at said respective level.

16. The method as recited in claim 11, wherein said iso-grid composite component is a portion of an external flap of an exhaust nozzle.

17. A method of constructing an iso-grid composite component comprising:
forming a uni-tape ply bundle including uni-tape plies and a first spacer ply, each of said uni-tape plies defining a first height, said first spacer ply defining a second height different from said first height; and
forming a spacer including a second spacer ply, said second spacer ply defining a third height different from said first height, said spacer transverse to said uni-tape ply bundle such that said spacer is interrupted by said uni-tape ply bundle.

18. The method as recited in claim 17, wherein each of said uni-tape plies includes a first material, said first spacer ply includes a second material that is different from said first material in fiber construction, and said second spacer ply also includes said second material.

19. The method as recited in claim 17, comprising:
forming an interstitial ply layer adjacent said uni-tape ply bundle and said spacer, said interstitial ply layer including a third material different in fiber configuration from said first material.

20. The method as recited in claim 17, wherein said iso-grid composite component is a portion of an external flap of a convergent-divergent exhaust nozzle.

* * * * *

UNITED STATES PATENT AND TRADEMARK OFFICE
CERTIFICATE OF CORRECTION

PATENT NO. : 9,789,570 B2
APPLICATION NO. : 14/753071
DATED : October 17, 2017
INVENTOR(S) : Russell B. Hanson Page 1 of 1

It is certified that error appears in the above-identified patent and that said Letters Patent is hereby corrected as shown below:

In the Claims

In Claim 19, Column 6, Line 41; after "The method as recited in claim" replace "17, comprising:" with --18, comprising:--

Signed and Sealed this
Twenty-fourth Day of July, 2018

Andrei Iancu
*Director of the United States Patent and Trademark Office*